United States Patent [19]
Johnson et al.

[11] 3,972,500
[45] Aug. 3, 1976

[54] APPARATUS FOR A CARGO RESTRAINT SYSTEM

[76] Inventors: J. Algot Johnson, 9 Sheridan Drive, Short Hills, N.J. 07078; Robert Kennedy, 203 Matoaka Court, Williamsburg, Va. 23185

[22] Filed: Nov. 20, 1972

[21] Appl. No.: 308,303

[52] U.S. Cl. .............................................. 248/485
[51] Int. Cl. ............................................ B65j 1/22
[58] Field of Search ........ 248/119 R, 361 A, 361 R; 105/369 A; 280/179 A

[56] References Cited
UNITED STATES PATENTS

| | | | |
|---|---|---|---|
| 833,454 | 10/1906 | Flemming | 248/119 R X |
| 2,159,848 | 5/1939 | Gibbons | 280/179 A |
| 2,736,272 | 2/1956 | Elsner | 105/369 A |

FOREIGN PATENTS OR APPLICATIONS

| | | | |
|---|---|---|---|
| 131,605 | 4/1920 | United Kingdom | 248/361 R |

*Primary Examiner*—William H. Schultz
*Attorney, Agent, or Firm*—Howard I. Podell

[57] ABSTRACT

Apparatus for the restraint of cargo in carriers such as freight containers, highway trucks and trailers, railroad cars, ships, aircraft and space vehicles. The apparatus includes continuous rails which are fastened flush to the floor of the cargo carrier and to the structural supports of said floor. A continuous undercut groove in the rail serves to fasten, at any point, load restraint chocks which are braced directly against the cargo loads. The chocks are designed with eyes and other tie-down anchor means to which flexible straps about the cargo load are anchored. The chock may also be fabricated with an adjustable blocking member to fit against a lateral side of a cargo load so as to apply additional lateral bracing to the cargo load.

7 Claims, 6 Drawing Figures

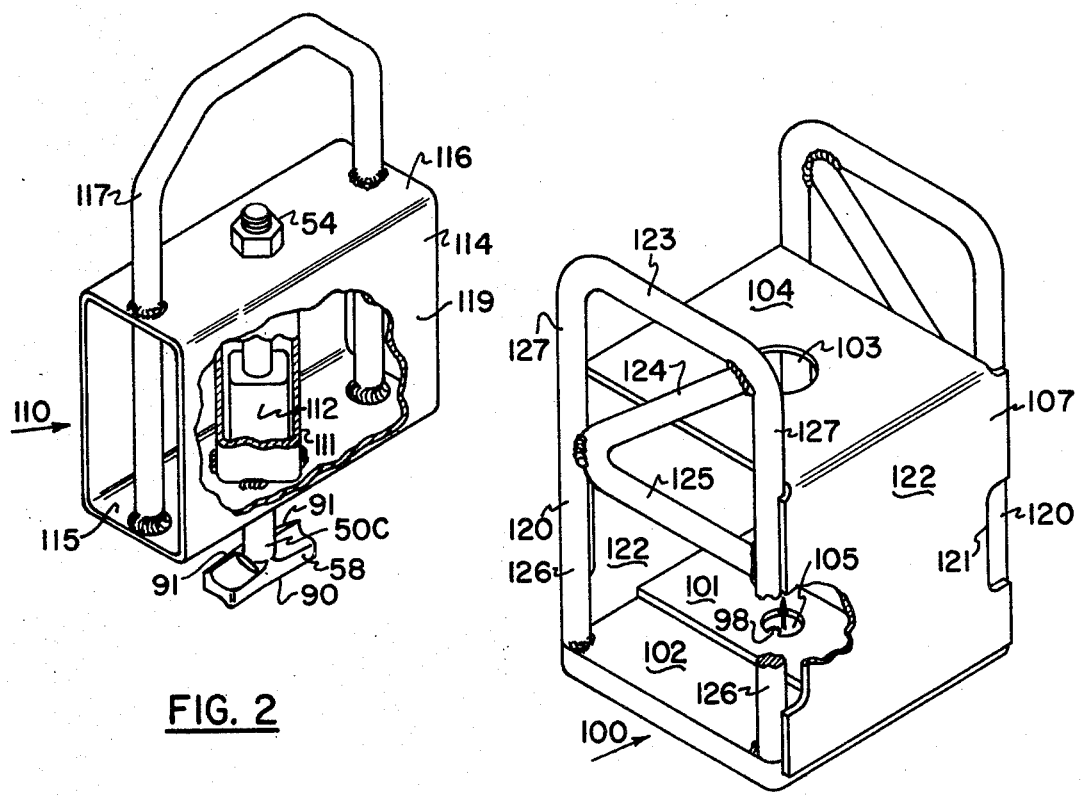
FIG. 2
FIG. 3
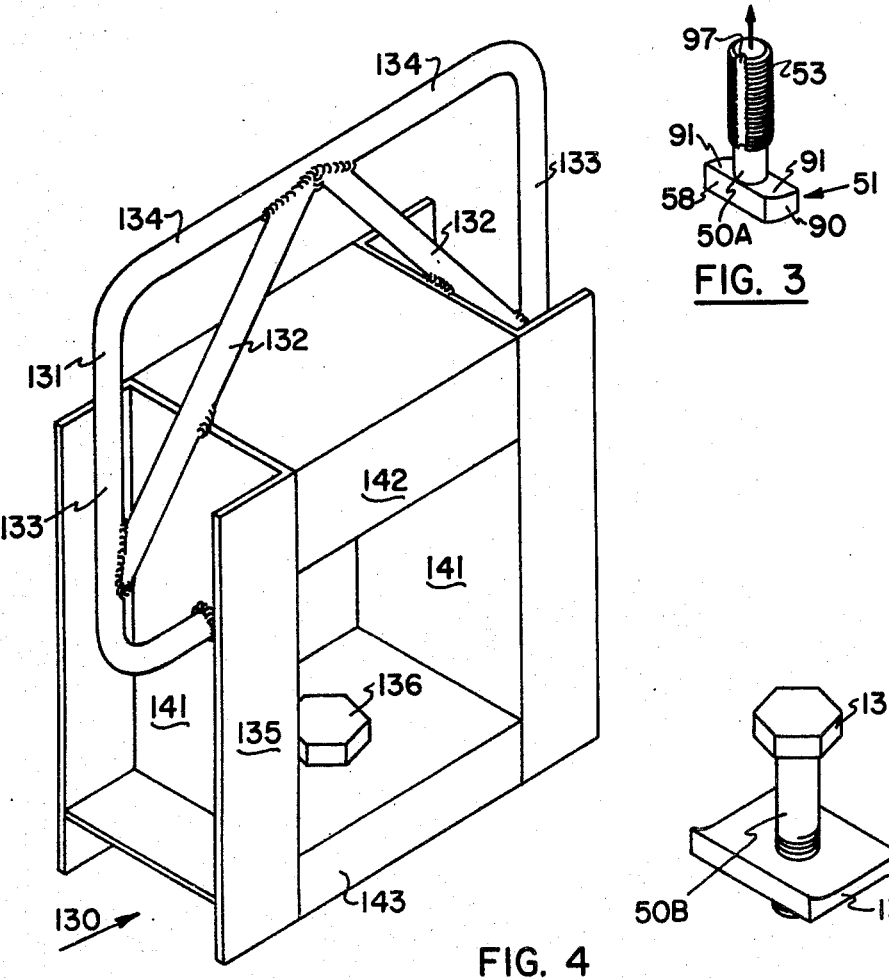
FIG. 4

APPARATUS FOR A CARGO RESTRAINT SYSTEM

BACKGROUND OF THE INVENTION

1. Field of the Invention

This invention relates to apparatus for the bracing and restraint of cargo loads that are carried in carriers such as freight containers, highway trucks and trailers, railroad cars, ships, aircraft and space vehicles.

2. Description of the Prior Art

Prior forms of load restraint of cargo employ load separators which are fastened to the sides of the cargo container, with the necessity of incorporating considerable hand-fitted lumber or other dunnage material between the cargo loads and the load separators. Such systems provide some longitudinal cargo restraint but little lateral restraint. Straps fastened to the load separators and over the cargo load may furnish additional limited vertical load restraint, but the restraint furnished by such systems is limited by the size and shape of the load separators, and by the amount of restraint load which may be absorbed from the load separators into the secondary structure such as the walls and sides of the cargo carrier.

Other load restraint mechanisms feature fittings which are bolted into fixed positions in the carrier floor or walls, or are tied by chains about the side rails of the carrier. Such devices cannot directly restrain cargo shifting loads occurring in all three axes of motion, nor can they be directly adjusted to fit against the cargo load and to transport the cargo restraint forces into the floor supporting structure of the cargo container.

SUMMARY OF THE INVENTION

This invention relates to an apparatus for the bracing and restraint of cargo which is carried in carriers such as freight containers, highway trucks and trailers, railroad cars, ships, aircraft and space vehicles.

A prime object of this invention is to provide a means of protecting cargo in transit from damage caused by shifting, due to the induced or natural shock and vibrational forces caused under transport conditions.

A further object of this invention is to reduce the weight and the space now required by conventional load separators employed for the purpose of cargo restraint.

An advantage of this invention is that the cargo restraint apparatus employed protects the cargo load from shifting due to forces in the vertical, longitudinal and lateral planes.

A further advantage of this invention is that all the cargo load restraint forces carried by the apparatus are transferred into the floor structure of the cargo carrier without deforming the sides or ends of the cargo carrier. The apparatus of this invention is thus well suited for the restraint of cargo in flat racks and other cargo containers which do not have structural sides or ends.

A most important advantage of the apparatus of the invention is that the parts and fittings making up the restraint system are completely reuseable, eliminating the conventional wastes associated with the one-time use of costly and heavy dunnage materials that now require custom fitting by skilled craftsmen for each loading of the cargo carrier.

The present invention utilizes one or more continuous rails mounted flush with the floor of the cargo carrier, with said rail being fastened to the primary structure which supports the floor of the cargo carrier.

The rail is fabricated with a continuous undercut groove running along its length, which is preferably in the longitudinal direction of the carrier. The load restraint chocks may be fastened into the groove of the rail so as to lock along any point in the length of the rail where it is necessary for the chock to brace against a cargo load.

The load restraint chocks are fabricated with eyes and other tie-down means to which flexible straps, fastened about the cargo load, may be anchored. The load restraint chock may also be fitted with an adjustable blocking member which may be locked in place by a threaded bolt to enable the blocking member to directly apply lateral bracing to the cargo load.

A load chock is thus enabled to directly apply longitudinal and lateral restraint to a cargo load, with straps anchored to the chock furnishing direct vertical restraint as well as additional lateral and longitudinal restraint, with all the load restraining forces being directly transferred and distributed by the flush rail into the primary floor supporting structure of the cargo container.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 2 is a perspective view of an alternate form of the cargo chock;

FIG. 3 is a perspective view of a second alternate form of the cargo chock;

FIG. 4 is a perspective view of a third alternate form of cargo chock;

DESCRIPTION OF THE PREFERRED EMBODIMENT

Figure 1:
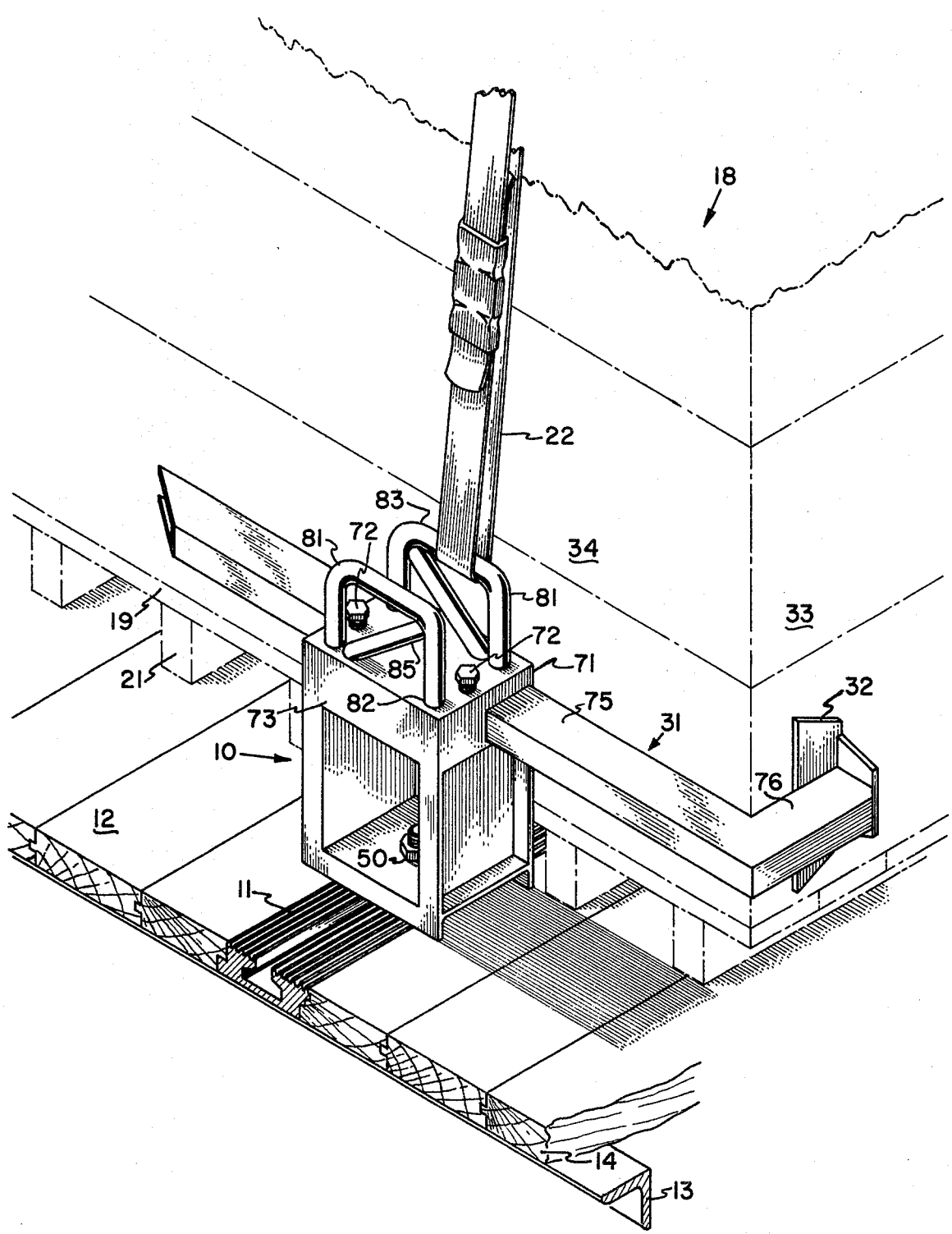
FIG. 1 is a perspective view of a cargo chock, fastened in position.

Turning now descriptively to the drawings, in which similar reference characters denote similar elements throughout the several views, and in which descriptive terms of orientation, such as up and down, horizontal and vertical, above and below, refer to the invention when employed in its customary mode of operation, except when specifically otherwise noted, FIG. 1 illustrates the interior of a cargo carrier in which a cargo load 18 mounted on a conventional pallet 19 is mounted on the floor 12 of the cargo carrier, and restrained from motion along all three axes by cargo chock 10, which is attached by bolt 50 to the shaped floor rail 11, mounted on the floor support beams 13, in between conventional lapped sections of wood planks 14.

Figure 5:
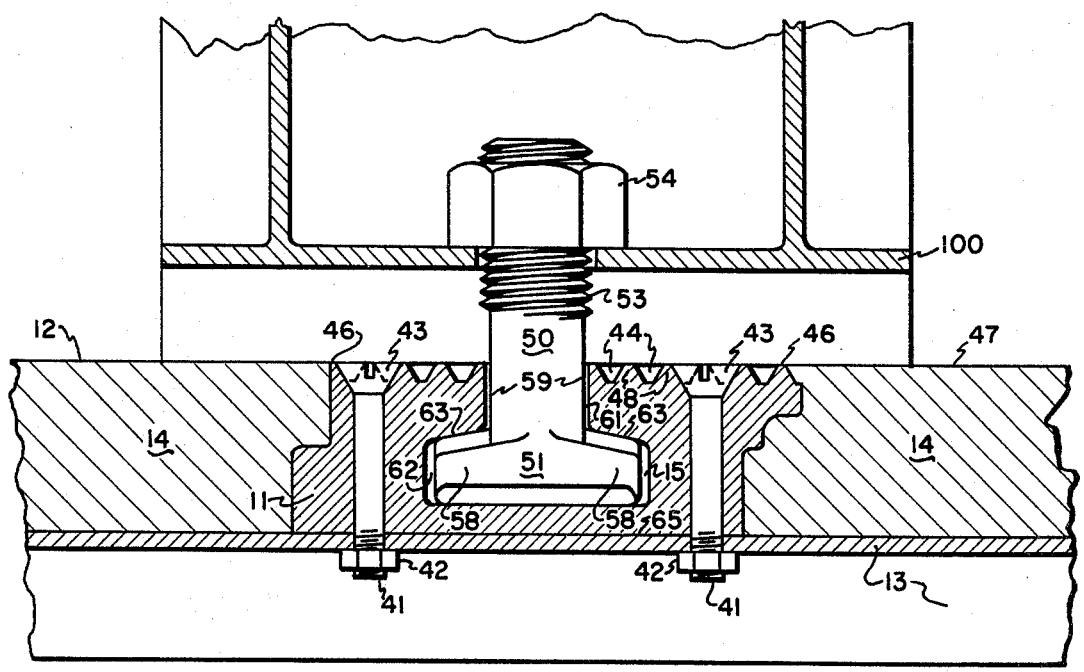
FIG. 5 is a transverse cross-sectional view of the floor rail of the cargo carrier, with installed cargo chock.
Figure 6:
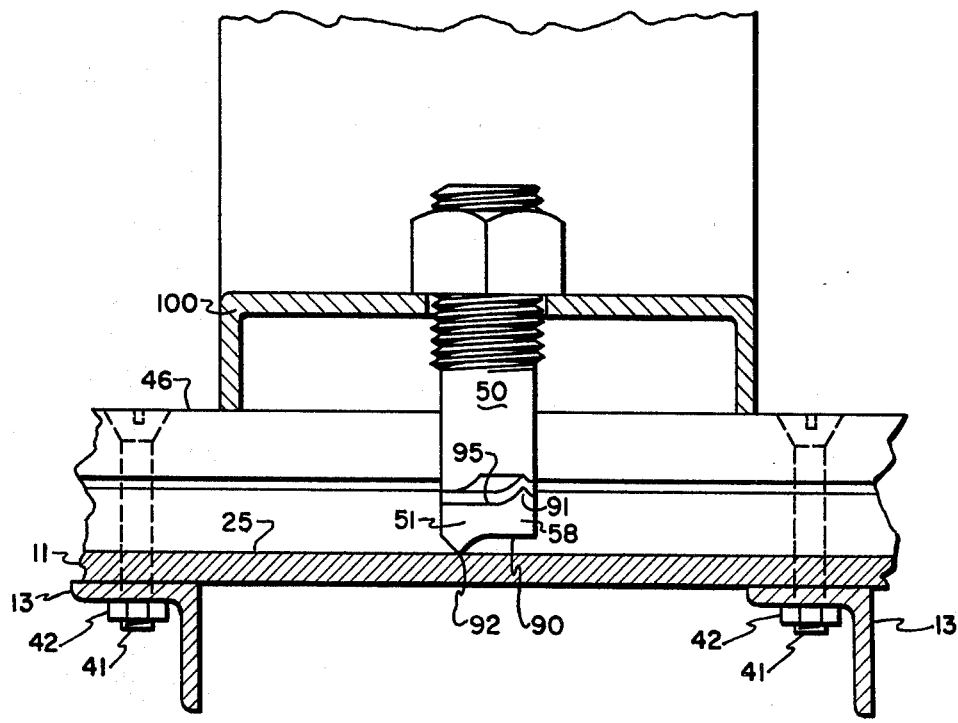
FIG. 6 is a longitudinal sectional view of the floor rail of the cargo carrier, with installed cargo chock.

Floor rail 11, as shown in FIGS. 5–6, runs continuously along the length of the cargo carrier, which may be a truck body, a freight container, a railroad car or other cargo carrier vehicle. The floor rail 11 is bolted directly to the transverse floor support beams 13 by threaded screws 41 and mating threaded nuts 42, with the flat heads 43 of the screws 41 being countersunk below the top surface 46 of the floor rail 11. The top surface 46 of the floor rail 11 may protrude above the top surface 47 of the floor planks 12 so that the bottom surface of attached chock 100 rests directly on the floor rail 11.

A shaped longitudinal groove 15 runs the full length of the floor rail 11, with said groove 15 being open along the top surface 46 of the floor rail 11. Parallel longitudinal grooves 44 of a lesser depth than shaped groove 15 may be formed in the top surface 46 of the rail 11 on each side of shaped groove 15 so that the upper face of the rail 11 is formed of longitudinal ribs 48 separated by shallow longitudinal grooves 44 on each side of the longitudinal shaped groove 15 of the rail 11.

Shaped groove 15 is uniformly formed throughout its length with a narrow neck section 61 in the upper section of the rail and a wider base section 62 in the mid-section of the rail. The wider base section 62 is joined to the narrower neck section 61 by a beveled surface 63 which is inclined upwards from the sides of the base section 62 to the sides of the neck section 61 of the grooves 15, with beveled surface 63 forming on each side of neck section 61 an acute angle to the horizontal plane of the bottom surface 65 of the floor rail 11, and with the planes of the beveled surfaces 63 on each side of the neck section 61 intersecting at the mid-point of the neck section 61 of the groove 15.

Neck section 61 of the groove is of a width slightly greater than the diameter of the shank 59 of specially shaped bolt 50 which fits into groove 15, with the base section 62 of groove 15 being of a width that is slightly greater than the maximum length of the shaped head 51 of bolt 50.

A cargo carrier equipped with the invention would have several rails 11 running the length of the carrier, with each rail being separated by one or more planks 14 of wooden flooring which also are fastened to the supporting transverse floor beams 13. Since conventional floor planks 14 are formed with side laps, the external sides of floor rail 11 may be shaped so as to mate with and overlap the shaped sides of the floor planks 14.

Referring to FIG. 1, floor chock 10 is bolted to the floor rail 11 by means of bolt 50 so that one external bearing face 71 of the chock 10 bears against a longitudinal end of the pallet 19 and attached load 18 which is conventionally strapped down to the pallet 19. Pallet 19 rests on the attached legs 21 on the flooring 12 of the cargo carrier. Lateral arm member 31 of chock 10 is slidably fitted through the upper section of chock 10 so as to slide in a sidewise direction with screws 72, which are threaded to the body 73 of chock 10 being positioned so as to bear against the top or side of the lateral arm member 31 and fix it in position to chock 10, when the lateral arm member 31 is properly located to brace the lateral side 33 of the load 18. One end 76 of lateral member 31 is formed at a perpendicular angle to the arm 75 of lateral member 31, with both the axes of angled end 76 and arm 75 lying in the horizontal plane when the lateral arm member 31 is fastened in position to the body 73 of chock 10. A bearing plate 32 may be welded to the inside face of angled end 76 to increase the side bearing area of the angled end 76 against a cargo load.

Lateral arm member 31, when fixed in position by screws 72, furnishes lateral support to the load 18, with bearing plate 32 of the angled end 76 of lateral arm member 31 bearing against the lateral side 33 of the load 18 and transferring any lateral forces, to which the load may be subject, to the body of the chock 10 and thence through chock bolt 50 to the floor rail 11 and the floor support beams 13. In a similar fashion, longitudinal external bearing face 71 of the chock 10 furnishes longitudinal support to the longitudinal face 34 of the load 18, against which longitudinal face 71 of the chock bears.

It is to be noted that load 18 would be similarly supported by additional anchored chocks 10 anchored to floor rails 11 at the diagonally opposed corner of load 18 and, if desired, at the other two corners of the load, so that each chock 10 directly absorbs lateral and longitudinal cargo loads in the direction from the load to the specific chock bearing face 73 and chock lever arm bearing plate 32.

Chock body 73 is fitted at its top with two sets of welded attached inverted U-shaped rods 81, with each end 82 of each rod 81 rising vertically above the chock body 73 for a distance of at least the width of a cargo strap 22, and each end 82 being joined by a horizontal mid-section 83, the length of which is of at least the width of a chock strap 22. A transverse rod 85 running at an angle of 45° to the horizontal mid-section 83 of the inverted U-shaped rod 81, is welded to the chock body 73 and a similar transverse rod 85 is welded to the other inverted U-shaped rod 81, such that both sets of transverse rods 85 are skew mounted along mutually perpendicular longitudinal axes, to serve as anchors for straps 22 mounted diagonally across the face 34 of the load.

Chock 10 may be fitted with two lateral arm members 31 so as to support independently the lateral forces acting on two adjoining loads that are separated by the chock 10, or one lateral arm member 31 may be fitted with two angled ends 76 mounted in T-fashion to the arm 75 of the transverse arm member 31 for the same purpose.

The chock 10 is mounted to the floor rail 11 at any position along the length of the floor rail by bolt 50 as shown in FIG. 6. Bolt 50 with specially shaped bolt head 51 is mounted so as to slide freely along its longitudinal axis in chock 10, but is locked in non-rotatable engagement with the chock 10 by one of several means, so that the axis of the wings 58 of the bolt head 51 runs parallel to the plane of the face surface 71 of the chock 10 and runs perpendicular, in the installed position, to the longitudinal axis of rail 11.

As shown in FIGS. 2, 3, 5 and 6, the profile of the bolt head 51 when viewed along the bolt axis, from the bolt shank 59, is of general rectangular cross-section, with the width of the bolt head being of a slightly lesser dimension than the width of the narrow neck section 61 of the groove 15 in floor rail 11, and the length of the bolt head being of a greater dimension, but less than the full width of the wider base section 62 of groove 15, such that the head 51 of bolt 50 may be inserted into groove 15, when the bolt and chock is so oriented that the axis of the wings 58 of the bolt head 51 are in the longitudinal direction of the groove 15 and floor rail 11. Once the bolt head 51 is inserted into groove 15, and rotated by approximately 90°, the bolt 50 may be be removed from groove 15 or rail 11 by an upward-acting force, but in that orientation the bolt 50 may be slid in the longitudinal direction of rail 11, prior to tightening bolt 50 to a chock body by nut 54. The tensile force developed in bolt 50 during tightening of nut 54, engaged to the male threads 53 of bolt 50, acts to drive the head 51 of the bolt against the beveled surfaces 63 of rail groove 15. Since the bolt 50 is heat treated or fabricated of a harder material than the aluminum floor rails 11 of the preferred embodiment, bolt head 51 will dig into the beveled surfaces 63 of the rail groove 11 to lock the tightened bolt and chock from longitudinal or rotational movement with respect to floor rail 11.

As shown in FIGS. 5–6, projections may be formed on the interior and exterior faces of the bolt head 51 so as to increase the biting action of the bolt head into the walls surrounding the groove 15 in the aluminum rail 11, when bolt 50 is tightened in position. A projecting tip 92 which comes to a pointed edge may be located on the exterior face 90 of bolt head 51 running along or adjacent to the long edge of the bolt head. A similar tipped projection 91 may be located on the interior face 95 of the bolt head 51, with projection 91 on the interior face running along or adjacent the long edge of the bolt head 51 which is on the opposite side of the longitudinal axis of the bolt 50 from projecting tip 92, with the axial distance between the tip of projection 91 and the tip of projection 92 being greater than the vertical spacing between the bottom wall 25 of the groove 15 and the upper beveled wall 63 of groove 15. In the erect vertical position, both projecting tips 91 and 92 bite into the respective walls of the groove 15 to prevent any sliding horizontal motion of the bolt 50 or attached chock. The loosened bolt 50 and attached chock is still free to slide horizontally in the direction of the axis of groove 15 with the bolt inclined at an angle to the vertical, but the tightening action of engaged nut 54 acts to bring bolt 50 to a vertical position and thus lock it in position.

Interior face 95 of bolt head 51 may be also beveled on each wing 58 of the bolt head 51, with such bevel faces being generally parallel to the beveled faces 63 of groove 15 when the bolt is mounted in the vertical position in the groove 15, so that the projecting tip 91 on the interior face 95 bites a uniform amount along the length of tip 91 into the beveled face 63 of groove 15.

Alternately, the exterior face 90 of bolt head 51 may be of a generally conventional smooth finish and free of any projections such as projecting tip 92. Interior face 95 of the bolt head may be finished with projecting tip 91 as heretofor described, or interior face 95 of bolt head 51 may be finished with a roughened or knurled surface so as to bite into beveled faces 63 of groove 15 when the bolt 50 is tightened. However, it must be anticipated that a greater tension force is required in bolt 50 to create the desired frictional biting engagement between bolt head 51 and the walls of groove 15 in the case of this alternate embodiment, than the tension force required in the case of the preferred embodiment illustrated in FIGS. 5–6, where the leverage involved in the alignment of the bolt to the true vertical position increases both the biting force and the resulting frictional engagement of the bolt head to the groove walls.

Bolt 50 is installed in the attached chock body prior to tightening so as to be slidable along the longitudinal axis of the bolt, with respect to the chock, but the bolt 50 is restrained in either loosened or tightened mode from rotation movement relative to the chock body of chock 50 by one of various means to be described.

As shown in FIG. 2, an illustration of the alternate embodiment chock 110, a hollow tube 111 of rectangular interior cross-section is welded to the chock body 114 so as to form the exterior housing for the fastened bolt 50, with tube 111 mounted in the vertical axis and welded to the base wall 115 and the top wall 116 of the chock body 114, at the mid-central positions of the base wall and the top wall. A rectangular core 112, dimensioned so as to fit freely in non-rotatable engagement in rectangular tube 111 is permanently fastened to the shank of bolt 50, or bolt 50 is initially fabricated with such a rectangularly shaped shank. Alternately, welded or other projections may be fastened to the shank of bolt 50 so as to provide the free non-rotatable engagement between bolt 50 and the interior walls of tube 111.

An alternate means for providing non-rotatable engagement between bolt 50 and the chock body is illustrated in FIG. 3, a view of the second alternate embodiment chock 100. A groove 97 is milled along the length of the shank and threads 53 of bolt 50A. Bolt 50A is formed with a head 51 of similar configuration to head 51 of bolt 50 but bolt 50A fits into a punched hole 105 in the base plate 102 and attached reinforcement plate 101 in which a projecting tongue 98 protrudes, with the shape of tongue 98 being dimensioned to freely fit into groove 97 of inserted bolt 50A. Free movement of bolt 50A is provided along the direction of the bolt axis between bolt 50A and hole 105, but rotation of bolt 50A in chock hole 105 is prevented and thus a non-rotatable engagement is provided between bolt 50A and chock body 107 of chock 100. Bolt 50A may be of a short length such that a nut 54 may fasten against reinforcement plate 101 in tightening the bolt 50A to the chock 100. In order to provide access to a driver socket of a wrench, a hole 103 may be located in top plate 104 of the chock body 107 directly above hole 105 in lower reinforcement plate 101, with hole 103 being of a size to admit a wrench driver or a wrench driver with attached female wrench socket through hole 103. Various other means may be employed to maintain the bolt 50 in non-rotatable engagement with the chock body, including a tongue or projecting rib on the shank of the bolt that mates loosely with a cut-out in the hole of the chock, or other non-round bolt shank shape and mating shaped hole.

As shown in FIG. 1, the chock 10 shown in FIG. 1, when tightened against the floor rail 11 by bolt 50 directly applies both longitudinal restraint through contact between the chock face 71 and the load face 34, and direct lateral restraint through contact between the bearing member 32 of the lateral arm member 31 and the side of the load 33. Vertical restraint of the load is applied by cloth or metal cargo straps 22 which are fastened over the load 18 and tied to the strap arms 83 welded to the top of the chock 10, and to the strap arms of a similar chock anchored on the other side of the load. Chock 10 may be utilized to partially so restrain two loads, with the chock located in between the two loads, and with the straps of each load tied to the same strap arm 83 or to adjoining strap arms.

As shown in FIG. 2, the chock 110 furnishes direct longitudinal restraint to the cargo load with vertical chock side 119 positioned to bear against a forward or a rearwood side of the load. Both vertical restraint and lateral load restraint are furnished by the JK-2A chock 110 by means of cargo straps 22 fastened over the top and about the sides respectively of the cargo load, with the straps being anchored to strap member 117. Strap member 117 is welded directly to both the top plate 116 and the base plate 115 of the chock 110 so as to carry the strapping load directly to the bolt 50C fastened to a floor rail 11, with bolt 50C being of a length to permit protruding through a hole in top plate 116, where it is readily accessible to wrenching of tightening nut 54.

The vertical end sides, separating vertical plates 119 of the chock 110 are open to provide accessibility of cargo straps 22 to the section of the strap arms between the top plate 116 and the bottom plate 115 of the chock 110. Each section of strap arm 117 is shaped above the top plate 116 so as to be in vertical orientation for a distance above the top plate 116, sufficient for mounting horizontally oriented cargo straps, and then each leg of strap arm 117 is bent, each towards the middle of the chock at an angle to the vertical so as to provide restraint for cargo straps which are angularly oriented to both the horizontal and vertical planes. The bent legs of the strap arm 117 then join together in a horizontal section about which vertically oriented cargo straps may be anchored.

As shown in FIG. 3, chock 100 is directly fastened to bolt 50A through hole 105 in a reinforcement plate 101 welded to the base plate 102, with the two sets of strap arms 120 fastened at each end to the base plate 102 and to the sides of the vertical side bearing plates 122. The edges of side plates 122 are relieved adjacent to the vertical section of strap arms 120, by cutouts 121 in the midsection of the side plates 122, so as to provide accessibility for a cargo strap 22 to be wrapped about the chock arm 120 between the base plate 102 and the top plate 104 of the chock 100. Additional anchorage for horizontal oriented cargo straps are provided on each strap arm 120 by the two vertical sections 127 of each strap arm which rise above the top plate 104 and are joined together by horizontal section 123 which provides anchorage for cargo straps oriented in the vertical plane. Additional anchorage for vertically oriented cargo straps is provided by a welded rod 125 joining the two vertical sections 126 of the strap arm 120 below the top plate 104 and above the base plate 102, with a transverse arm 124 running at an angle between one end of horizontal arm 125 and the other end of parallel horizontal section 123 of strap arm 120. The end sides of the chock 100 are otherwise open for accessibility of cargo straps to the strap arms, with the front and rear sides 122 and top 104 of the chock covered by plates.

As shown in FIG. 4, the third alternate embodiment chock 130 is designed with one set of strap arms 131 which consists of two vertical sections 133 for the attachment of horizontal oriented straps 22, with the ends of the strap arm member 131 being anchored to the sides 141 of the chock 130 at a location generally midway between the bearing faces 135 of the chock. Transverse strap sections 132 join both the vertical sections 133 and the horizontal sections 134 of the strap arm member to provide anchorage for straps which are oriented in an angular direction. The sides 141, top 142 and base 143 of the chock 130 are formed of C-sections of steel which are welded together to reform an open frame, with the angle sections of the sides, top and base forming the load bearing surfaces of the chock. Chock 130 may be anchored to floor rail 11 by a bolt 50B and nut 54 which fastens through a hole in the base 143 of the chock, or alternately a screw 136 may be employed to fasten the chock to a nut 137 which fits into the wide neck secion 62 of groove 15, with said nut being of a width and length that is greater than the width of the narrow neck section 61 of the groove 15, and with the thickness of nut 137 being less than the width of the narrow neck section 61 of groove 15, so that nut 137 may be placed in the groove 15 or removed, in a sideways fashion, but serves as an anchor against beveled walls 63 of groove 15, when screw 136 is tightened into nut 137. Chock 130, as fastened in FIG. 4 is free to rotate with regard to screw 136 but is kept in rotational orientation by the friction of the tightened bolt and by the bearing forces of the loads in front of and in back of the chock which are braced against the bearing faces of the sides, top and base angle sections of the chock 100.

The need for a cargo restraint system that will readily and securely fasten cargo, and particularly cargo of value, or sensitiveness to shock, such as ammunition, has prompted various agencies to set up test programs of the various conventional systems of lumber bracing, mechanical braces fastened to the sides of the cargo carrier, and other means as well as test programs of the chocks 10, and chocks 130.

Highly favorable results of such tests with regard to the invention were achieved, with both sets of tested model chocks. Chocks and rails conforming to this invention and designed for a load restraint factor of 2½ g acceleration impact, were tested in place on a railroad car, with the chocks restraining dummy loads of ammunition and the freight car tested under moving impact collisions against other stationary freight cars. The collision velocities ranged from 3.66 mph to 11.94 mph, with the freight car being measured in collision impacts ranging in values of from 3 to 24 g.

The chock restraint system of this invention passed such tests with successful restraint of attached cargo up to impact velocities of over 6 mph where the cargo-carrying freight car was recorded as receiving 10 g of acceleration impact force, with the cargo carrier which was mounted on the freight car receiving from 5 to 8 g of acceleration impact for a duration of 100 to 125 milliseconds with measured strap forces on the chocks reaching loads of up to 3570 pounds for a duration of 245 milliseconds.

The tests indicated a high factor of safety of the restraint system with failures of the chocks, or attaching bolts which were designed for loads of up to 2½ g occurring at railroad car collision velocities of 6.81 mph, and with total failure of the restraint system occurring when the railroad car collision velocity reached 11.94 mph. The 11.94 mph collision produced shocks of 24 g impact on the railroad car and shocks ranging from 8.1 to 11.0 g on the cargo carrier mounted on the railroad car in which the chocks and cargo were mounted, and the 6.81 mph collision produced shocks ranging from 5.6 to 9.5 g on the cargo carrier.

These and further tests currently being conducted indicate the high factor of safety inherent in the use of the subject restraint system and the chocks and rails of this invention, which may be attributed to the fact that all restraint loads in the three vectors, longitudinal, lateral and vertical are directly transmitted by the restraint system from the cargo directly to the floor rails of the cargo carrier, such destructive loads by-passing all secondary structure of the cargo carrier and obviating the need for lumber bracing of cargo or other more expensive dunnage.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what we claim as new and desire to secure by Letters Patent of the United States is:

1. A cargo restraint system for cargo carriers adaptable for the restraint of the fastened cargo in the longitudinal, lateral and vertical axes, and which transfers all restraint forces generated by inertia forces of the cargo directly to the floor supports of the cargo carrier, comprising, a continuous floor rail which is adaptable for fastening to the floor support members of the cargo carrier, said floor rail being formed with a continuous groove along its length open to the upper surface of the floor rail, with said groove extending from the upper surface of the floor rail, and with the upper section of the groove being narrower than the lower section of the groove in the interior portion of the floor rail, and a load restraint chock which may be fastened to the floor rail at any position along the length of the floor rail, with means to tighten the load restraint chock securely to the floor rail at any position of the floor rail, said load restraint chock being formed with one or more vertical bearing surfaces adaptable to be braced against an exterior vertical surface of the load, together with a strap arm which is fastened to the load restraint chock, said strap arm being adaptable for fastening to a flexible strap which may be tied about the cargo with said load restraint chock adaptable to be fastened to the floor rail in fixed engagement with the floor rail by means of a fastener, one end of which is anchored in the undercut section of the groove of the floor rail, with the other end of the fastener being anchored to the load restraint chock such that the said fastener carries all loads, transmitted to the chock from the attached cargo, to the floor and to the floor rail and from thence to the floor supports of the cargo carrier on which the floor rail is mounted, in which the means to tighten the load restraint chock securely to the floor rail comprises a fastener anchored to the bottom of the chock fixed in non-rotatable engagement with the chock, said fastener projecting in the shape of a headed rod below the bottom of said chock and terminating in a bolt head which fits into the wider undercut portion of the floor rail groove, with the shank of said headed rod passing freely through the narrow upper section of the floor rail groove, in which the head of the rod is of an oblong shape such that the maximum width of the head is less than the width of the upper narrow section of the groove in the floor rail, with the length of the head of the said rod being greater than the width of said narrow section of the groove, but the length of the rod head being less than the width of the wider lower section of the groove, with the interior bearing face of the rod head formed with a sharp projection so as to bite into the mating bearing surface of the floor rail groove when the rod and attached chock are under the tension force of a cargo tension strap fastened to the strap arm of the chock which pulls the chock and attached rod and rod head upwards from the floor rail in which the rod head is located.

2. A cargo restraint system for cargo carriers adaptable for the restraint of the fastened cargo in the longitudinal, lateral and vertical axes, and which transfers all restraint forces generated by inertia forces of the cargo directly to the floor supports of the cargo carrier, comprising, a continuous floor rail which is adaptable for fastening to the floor support members of the cargo carrier, said floor rail being formed with a continuous groove along its length open to the upper surface of the floor rail, with said groove extending from the upper surface of the floor rail, and with the upper section of the groove being narrower than the lower section of the groove in the interior portion of the floor rail, and a load restraint chock which may be fastened to the floor rail at any position along the length of the floor rail, with means to tighten the load restraint chock securely to the floor rail at any position of the floor rail, said load restraint chock being formed with one or more vertical bearing surfaces adaptable to be braced against an exterior vertical surface of the load, together with a strap arm which is fastened to the load restraint chock, said strap arm being adaptable for fastening to a flexible strap which may be tied about the cargo with said load restraint chock adaptable to be fastened to the floor rail in fixed engagement with the floor rail by means of a fastener, one end of which is anchored in the undercut section of the groove of the floor rail, with the other end of the fastener being anchored to the load restraint chock such that the said fastener carries all loads, transmitted to the chock, from the attached cargo to the floor and to the floor rail and from thence to the floor supports of the cargo carrier on which the floor rail is mounted, the fastener which anchors the chock to the floor rail in the tightened mode being in the form of a threaded bolt which, in the loosened mode, engages the chock so that the fastener may move freely to the axial directions of the bolt with respect to the chock, but is linked to the chock so that the bolt may not rotate about its axis with respect to the chock, said bolt being fastened to the load restraint chock by a female threaded nut which bears against an exposed section of the load restraint chock, such that the nut is accessible to engagement by a wrench, said bolt being anchored to the floor rail in the tightened mode by means of the bolt head which fits into the wider undercut portion of the floor rail groove, with the shank of said bolt passing freely through the narrow upper section of the floor rail groove in non-rotatable engagement with the load restraint chock, the head of the bolt being of an oblong shape such that the maximum width of the head is less than the width of the upper narrow section of the groove in the floor rail, with the length of the head of the bolt being greater than the width of said narrow section of said groove, but the length of the bolt head being less than the width of the wider lower section of the groove in the floor rail, with the interior bearing face of the bolt head formed with a rough surface so as to bite into the mating bearing surface of the floor rail groove when the bolt is fastened by means of an engaged nut.

3. The combination as recited in claim 2, in which sharp projecting edges protrude from the bearing surface of the interior face of the bolt head so as to bite into the mating bearing surfaces of the floor rail in the tightened mode of the bolt.

4. The combinaton as recited in claim 3, in which a sharp edge protrudes in the axial direction of the bolt from the external face of the bolt head, with the distance between the tip of said sharp edge on the exterior face of the bolt head to the tip of the sharp edge on the interior face of the bolt head, in the axial direction of the bolt, being greater than the distance in the groove of the floor rail from the bottom surface of the groove to the bearing surface of the groove so that as the axis of the bolt, in the tightened condition, becomes perpendicular to the axis of the engaged floor rail, the sharp edges of the exterior and the interior faces of the bolt head bite into the bottom face of the groove and the bearing face of the groove walls respectively, while in the loosened condition of the bolt, the bolt may slide freely in the axial direction of the floor rail by rotating the bolt about the bolt head so that the axis of the bolt is no longer perpendicular to the axis of the floor rail.

5. The combination as recited in claim 2, in which an arm member is fastened to the load restraint chock so that said arm member may be moved, in the loosened mode in a direction parallel to the bearing surface of the chock against the cargo load, together with means to lock said arm in fixed engagement with the chock, said arm being fitted at one free end of the arm with a member which protrudes in a generally perpendicular direction to the axis of the arm, said protrusion being adaptable to bearing against a side of the cargo load that is perpendicular to the side of the cargo load which bears against the bearing face of the chock.

6. The combination as recited in claim 5, in which the arm is locked into engagement with the chock by means of a threaded screw member engaged in a female thread anchored to the chock body.

7. The combination as recited in claim 6, in which the female thread is integrally fastened to the body of the chock.

* * * * *